United States Patent [19]

Hisatomi

[11] Patent Number: 4,502,560
[45] Date of Patent: Mar. 5, 1985

[54] SMALL-SIZED SNOWMOBILE
[75] Inventor: Itaru Hisatomi, Iwata, Japan
[73] Assignee: Yamaha Hatsudoki Kabushiki Kaisha, Japan
[21] Appl. No.: 475,123
[22] Filed: Mar. 14, 1983
[30] Foreign Application Priority Data
Jul. 20, 1982 [JP] Japan .................. 57-126226
[51] Int. Cl.³ .............................. B62M 27/02
[52] U.S. Cl. ..................... 180/190; 180/9.1; 180/9.46; 180/9.54; 280/21 R; 305/21; 305/24
[58] Field of Search .............. 180/190, 193, 180, 181, 180/182, 19.1, 19.2, 19.3, 9.46, 9.2, 9.1, 9.52, 9.54; 280/12 R, 16, 21 R; 305/21, 24

[56] References Cited
U.S. PATENT DOCUMENTS

| | | | |
|---|---|---|---|
| 2,323,526 | 7/1943 | Eliason | 180/9.52 X |
| 2,846,017 | 8/1958 | Luchterhand | 180/9.54 X |
| 3,106,980 | 10/1963 | Rogneby | 180/19 R |
| 3,568,787 | 3/1971 | Gremeret | 180/181 |
| 3,734,219 | 5/1973 | Christensen et al. | 180/190 |
| 3,779,326 | 12/1973 | Trautwein | 180/190 |
| 4,036,320 | 7/1977 | Rabehl | 180/190 X |
| 4,155,414 | 5/1979 | Fujikawa et al. | 180/190 X |
| 4,407,386 | 10/1983 | Yasui et al. | 180/193 |
| 4,434,867 | 3/1984 | Grinde | 180/190 |
| 4,437,534 | 3/1984 | Grinde | 180/9.54 X |
| 4,442,913 | 4/1984 | Grinde | 180/9.54 X |

Primary Examiner—Joseph F. Peters, Jr.
Assistant Examiner—Mitchell J. Hill
Attorney, Agent, or Firm—Ernest A. Beutler

[57] ABSTRACT

A lightweight snowmobile having a suspension arrangement that permits a rider to lean the frame relative to its narrow driving belt. An arrangement is provided for limiting the pivotal movement of the frame relative to the driving belt so that the center of gravity can not shift transversely beyond the periphery of the driving belt.

4 Claims, 5 Drawing Figures

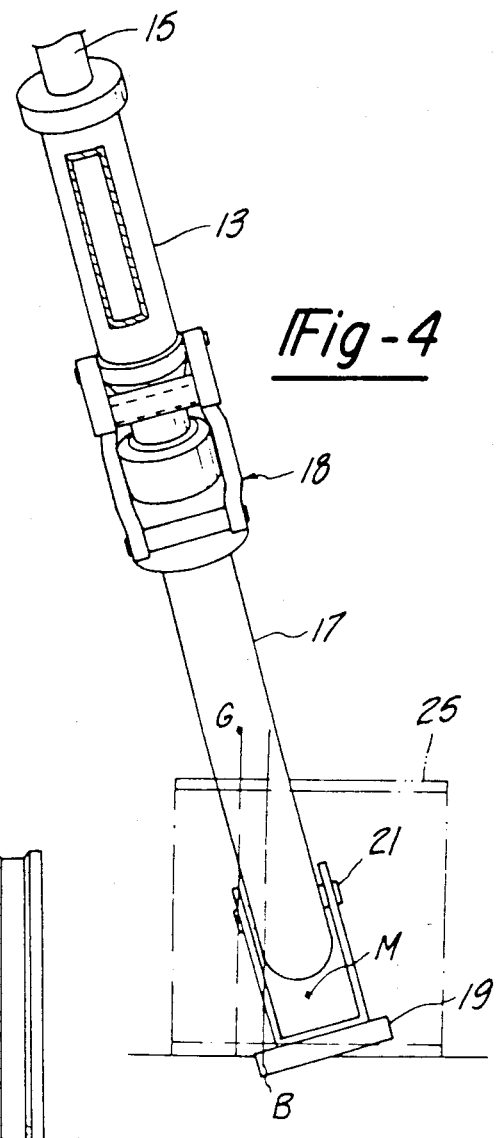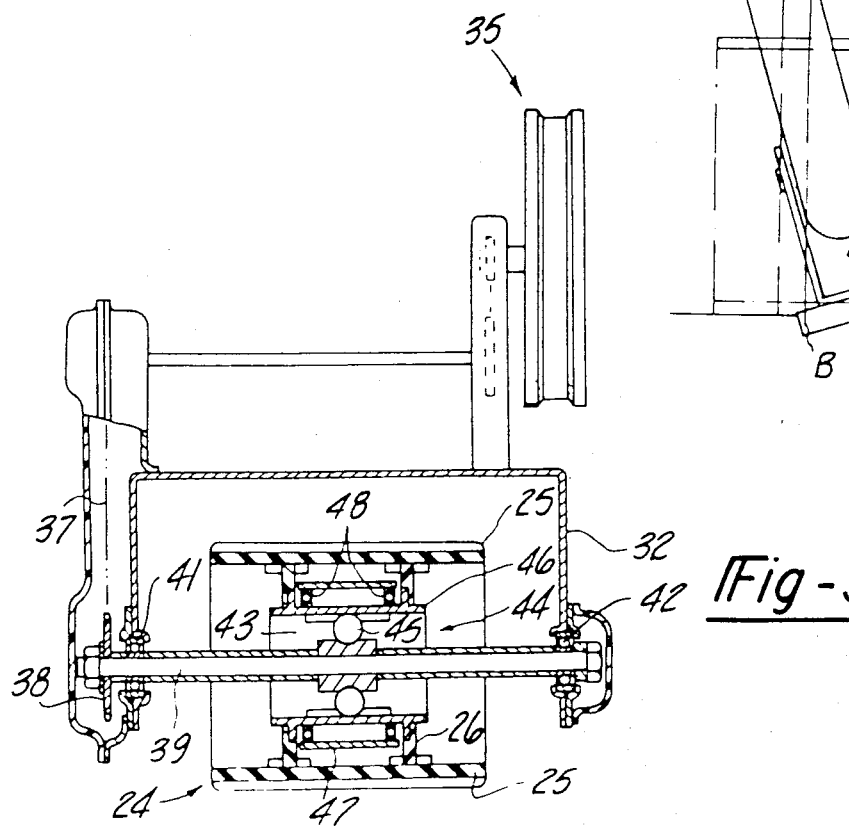

SMALL-SIZED SNOWMOBILE

BACKGROUND OF THE INVENTION

This invention relates to an improved, small-sized snowmobile and more particularly to an improvement in a snowmobile of the type that has one relatively narrow steering ski at the front and one relatively narrow driving track at the rear.

It has been proposed to provide a snowmobile that is intended primarily for use by a single rider and which has its handling and traction improved by providing for pivotal movement between the body and the driving track about an axis that extends longitudinally of the snowmobile. Such an arrangement can improve handling by permitting the rider to lean into a turn without deteriorating the contact area between the driving track and the terrain over which it is travelling. Although the use of such a snowmobile wherein the body is pivotal relative to the driving track to allow leaning into a turn greatly improves the handling and permits the use of relatively narrow belts without adversely affecting trackability in varying conditions and handling, it raises another problem. That is, if the body of the snowmobile is pivotal relative to the driving belt, the snowmobile has a tendency to fall over when it is not in use. If an operator is not on the vehicle and it is left unattended, the body tends to pivot about its pivotal axis and can cause the snowmobile to fall over. Although the use of a kickstand as is employed with a motorcycle could be incorporated into a snowmobile for holding it in an upright condition under such conditions, conventional kickstands are not readily adaptable to snowmobiles because of the fact that they are parked on the snow. Normal motorcycle kickstands have a relatively small contact area and this is insufficient to support the full weight of a snowmobile on snow.

It is, therefore, a principal object of this invention to provide an improved snowmobile of the type wherein the body portion may lean relative to the driving track.

It is another object of this invention to provide an improved leaning type of snowmobile in which the maximum pivotal movement is restrained so as to improve stability both when operating and when leaving the vehicle unattended.

It is a further object of this invention to provide an improved parking support for a snowmobile of the leaning type.

SUMMARY OF THE INVENTION

This invention is adapted to be embodied in a small, lightweight vehicle having a frame, front ski supported for steering movement by the frame and an endless driving belt. The driving belt has a drive portion that is positioned for engaging the terrain over which the vehicle is operated and power means drive the driving belt for driving the vehicle. In accordance with the invention, suspension means support the drive belt and frame for relative pivotal movement about an axis that extends generally longitudinally of the frame so that an operator may lean the frame relative to the driving belt without changing the area of engagement between the driving belt and the terrain. In further accordance with the invention, means are provided for limiting the degree of pivotal movement between the frame and the driving belt.

BRIEF DESCRIPTION OF THE DRAWINGS

FIG. 4 is an enlarged cross-sectional view taken along the line 4—4 but showing the snowmobile in a leaned condition which may correspond to the parked condition of FIG. 3.

FIG. 5 is an enlarged cross-sectional view taken along the line 5—5 of FIG. 1.

DETAILED DESCRIPTION OF THE PREFERRED EMBODIMENT OF THE INVENTION

Figure 1:
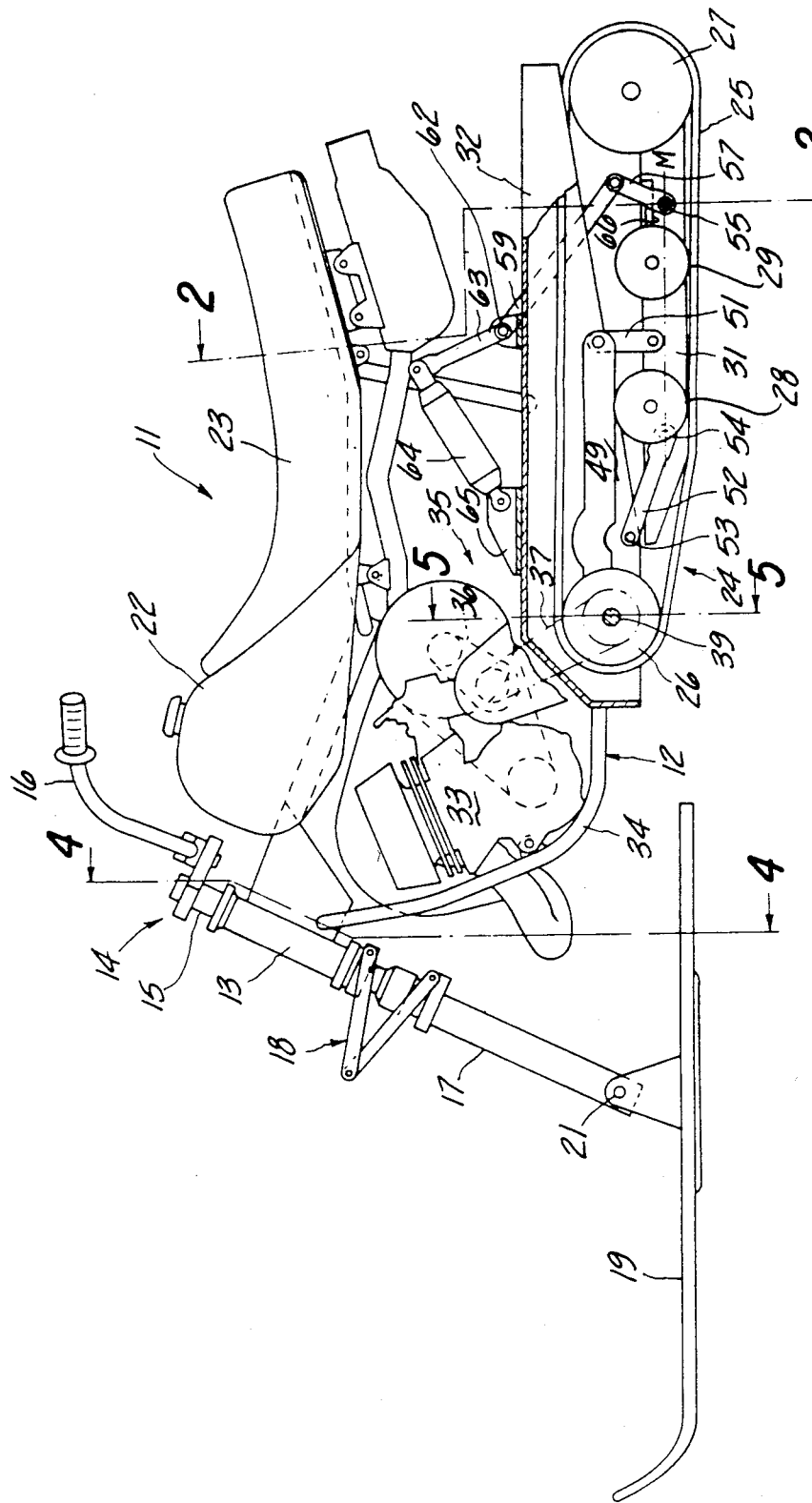
FIG. 1 is a side elevational view, with a portion broken away, of a lightweight snowmobile constructed in accordance with the invention.

A small, lightweight snowmobile constructed in accordance with an embodiment of the invention is identified generally by the reference numeral 11. The snowmobile 11 is particularly adapted for use over a wide variety of terrains and is particularly designed so as to be used by a single rider. It is to be understood, however, that certain features of the invention may be used with other types of vehicles and/or with larger snowmobiles.

The snowmobile 11 includes a frame assembly, indicated generally by the reference numeral 12 and which may, in the illustrated embodiment, comprise a welded tubular assembly. It is to be understood, however, that when the term "frame" or frame means are used in the specification and/or claims, it is intended to embrace any type of frame or unitary body and frame assemblies as may be used with this type of vehicle. The frame 12 includes a head pipe 13 that supports a front steering mechanism, indicated generally by the reference numeral 14. The steering mechanism 14 includes a first tubular member 15 that is fixed axially relative to the head pipe 13 but which is rotatable relative to this pipe about a steering axis. A handlebar assembly 16 is affixed to the tubular member 15 for steering of it.

A lower tubular member 17 is carried by the tubular member 15 and is vertically movable relative to the tubular member 15 along the steering axis. A scissor type linkage assembly, indicated generally by the reference numeral 18, interconnects the tubular members 15 and 17 for simultaneous rotation while permitting this relative suspension movement. The suspension movement may be resisted by a shock absorber and spring assembly (not shown) that is suitably positioned within one of the tubular members 15 or 17.

A relatively narrow front ski 19 is pivotally connected to the lower end of the tubular member by means of a pivot pin 21. The pivot pin 21 permits pivotal movement of the ski 19 relative to the tubular member 17 about a pivot axis defined by the pivot pin 21 that is generally perpendicular to the steering axis. This pivotal movement permits the ski 19 to follow the incline of the terrain when the snowmobile 11 is travelling over non-level ground.

A fuel tank 22 is carried by the frame 12 to the rear of the headpipe 13. A seat 23 is also carried by the frame assembly 12 to the rear of the fuel tank 22. The fuel tank 22 and seat 23 may be of any known construction and are supported by the frame 12 in any suitable manner.

The snowmobile 11 is driven along the terrain over which it travels by means of a drive belt assembly, indicated generally by the reference numeral 24. The drive belt assembly 24 includes an endless driving belt 25 of any known type that has a relatively small width (for example, 15 to 25 centimeters). The belt 25 extends around a driving sprocket 26 at its forward end and a pair of guide wheels 27 at its rear end. In addition, the intermediate driving portion of the belt 25 is engaged by pairs of backup wheels 28 and 29. The guide wheels 27 and backup wheels 28 and 29 are all rotatably supported by means of a guide rail 31.

A sheet metal snow guard 32 of generally channel shape is affixed to the frame 12 and overlies the driving belt 25. The guard 32 is intended to prevent snow from being thrown upwardly from the driving belt 25 onto the rider and the mechanical components of the snowmobile 11.

An internal combustion engine of any known type, indicated by the reference numeral 33, is supported by the frame 12 for powering the snowmobile 11. The engine 33 may be supported by a pair of down tubes 34 of the frame assembly 12. The motor 33 drives a transmission of the infinitely variable type and which may include a centrifugal clutch, which transmission mechanism is identified generally by the reference numeral 35. The transmission 35 includes an output V-belt drive 36 which drives a driving chain 37. The chain 37 in turn drives a driven sprocket 38 (FIG. 5) that is affixed to an input shaft 39.

The input shaft 39 is journalled at its opposite ends in the snow guard 32 by means of a pair of spaced bearing assemblies 41 and 42. An intermediate portion of the driving shaft 39 non-rotatably carries an input member 43 of a constant velocity universal joint, indicated generally by the reference numeral 44. The universal joint 44 is of a type commonly used in the front wheel suspension of front wheel driven motor vehicles and includes a plurality of balls 45 that are received in corresponding grooves of the input member 43 and grooves of an output member 46. The output member 46 is affixed against rotation relative to the driving sprocket 26 and is, in turn, journalled in a housing 47 by means of bearings 48.

The frame 12 is supported for suspension movement relative to the driving belt 25 and also for pivotal movement relative to the belt 25 about a longitudinally extending axis, indicated by the line M. This suspension and leaning arrangement will now be described.

The driving sprocket support housing 47 is integrally connected to a rearwardly extending arm 49 that is contained within the driving belt 25. A link 51 is pivotally connected to the rear end of the arm 49 at its upper end and to the guide rail 31 at its lower end. The connection assures tht the housing 47 is held against pivotal movement relative to the guide rail 31 along the line M but permits longitudinal movement of the guide rail 31 relative to the housing 47 upon suspension travel.

The forward end of the guide rail 31 is supported for the suspension travel by means of a link 52 that is pivotally supported at its forward end by means of a pivot pin 53 on the snow guard 32. A universal joint 54 pivotally connects the rear end of the link 52 to the guide rail 31 so as to permit vertical movement of the guide rail 31 relative to the frame assembly 12 and also so as to permit tilting or leaning movement about the line M.

A universal joint 55, which may be similar to the joint 54, is positioned at the rear end of the guide rail 31 (FIGS. 2 and 3) and connects the guide rail 31 to a shaft 56 which is, in turn, pivotally connected to a pair of depending arms 57. The arms 57 are, in turn, affixed to a shaft 58 that is carried by a pair of depending arms 59 that are integrally connected by means of a transversely extending portion 61. The transversely extending portion 61 is journalled on the snow guard 32 by means of a pair of spaced brackets and bearings 62.

A lever 63 is affixed to the shaft 61 between the bearings 62 and extends generally upwardly. The upper end of the lever 63 is pivotally connected to one end of a combined shock absorber and spring assembly 64. The opposite end of the shock absorber and spring assembly 64 is pivotally connected to a bracket 65 that is affixed to the upper side of the snow guard 32.

When the snowmobile 11 is travelling along in a forward direction, the driving track 25 may move relative to the frame 12, such movement occuring in a generally pivotal nature about the input shaft 39. Upon such movement, the levers 57 effect rotation of the levers 59 and shaft 61. This movement is resisted in a known manner by means of the combined shock absorber and spring element 64.

Figure 3:
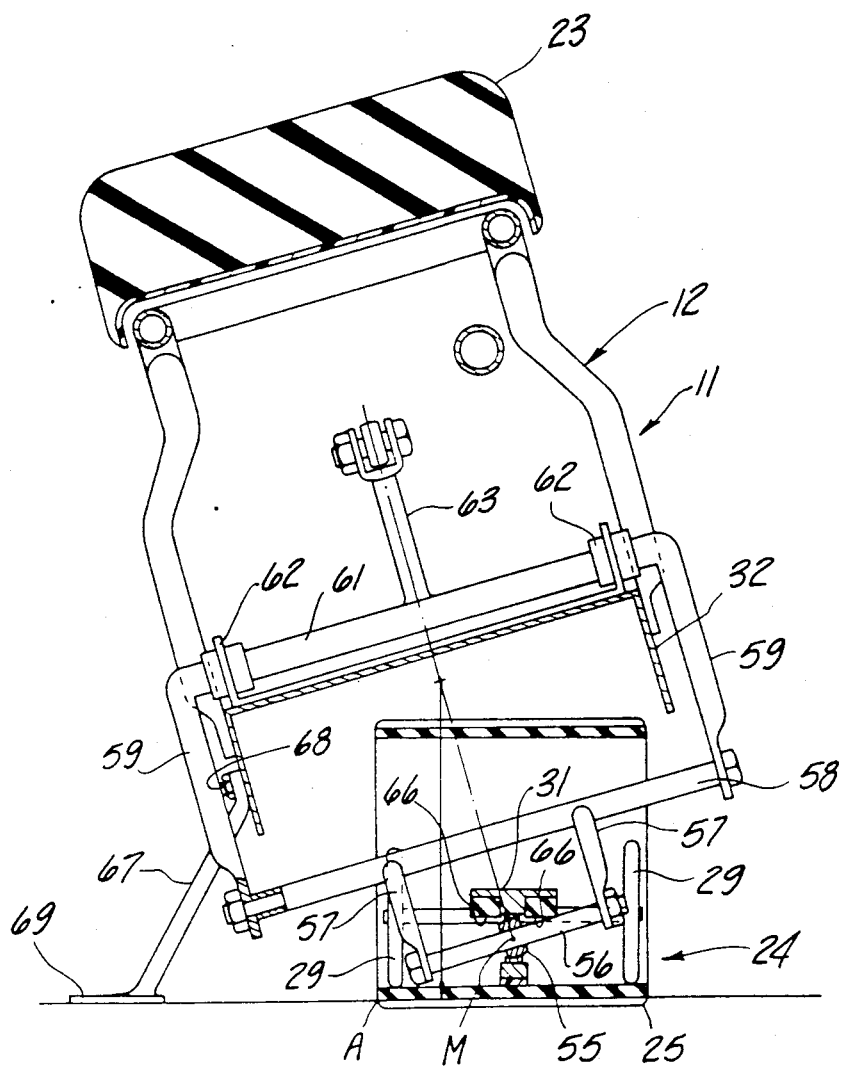
FIG. 3 is an enlarged cross-sectional view, in part similar to FIG. 2, showing the snowmobile in a parked condition.

When a rider wishes to turn the vehicle 11, the handlebars 16 are rotated in an appropriate direction. The rider may also lean into the turn and such leaning will effect pivotal movement of the frame assembly 12 relative to the driving track 25 about the axis M as shown in FIGS. 3 and 4. This leaning movement causes the front ski 19 to pivot relative to the terrain over which the vehicle is travelling.

Figure 2:
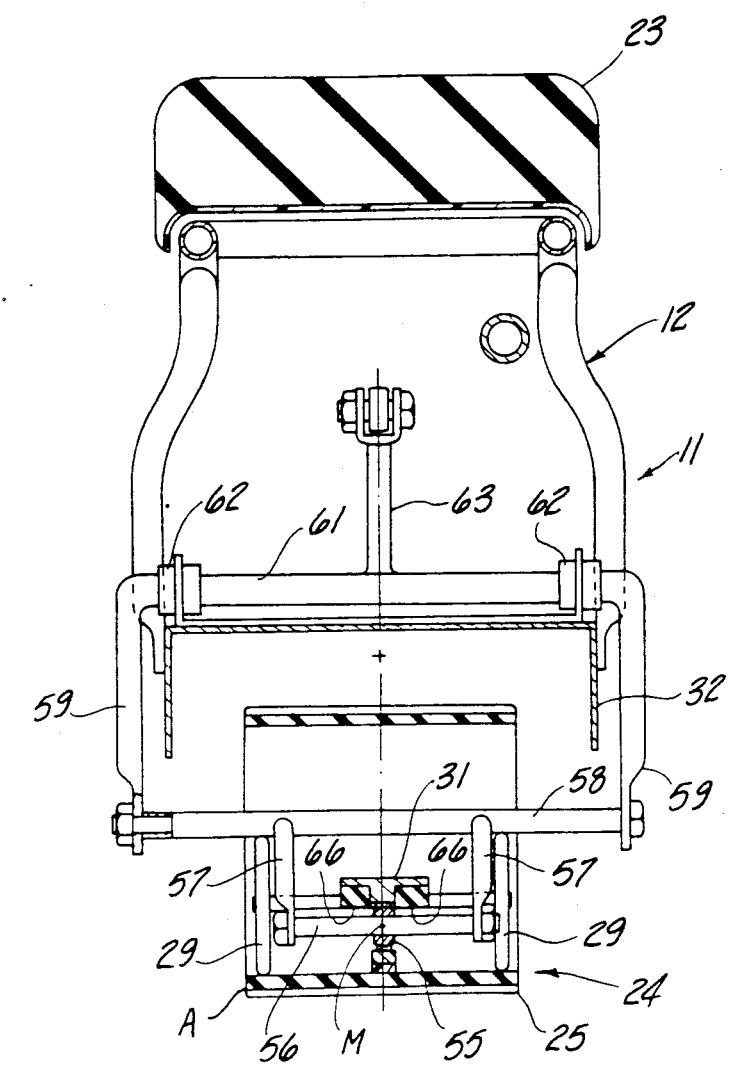
FIG. 2 is an enlarged cross-sectional view taken along the line 2—2 of FIG. 1 and shows the snowmobile when it is in a normal attitute.

An arrangement is provided for providing the maximum amount of tilting or leaning movement of the frame 12 relative to the drive track 25. For this purpose, a pair of elastomeric stops 66 are affixed to the guide rail 31 in proximity to the shaft 56 (FIGS. 2 and 3). The stops 66 are adapted to be engaged by the shaft 56 upon a predetermined amount of pivotal movement so as restrain the amount of permitted pivotal movement about the axis M. The purpose for these stops and their effectiveness will be described by primary reference to FIGS. 2 through 4.

The sprung portion of the snowmobile 11 has a center of gravity indicated by the point G. When the snowmobile 11 is travelling in a straight direction and/or when the frame 12 is not leaned relative to the drive belt 25, the center of gravity G will lie vertically above the leaning axis M and the vehicle will be inherently stable. However, if the center of gravity G is moved slightly to the left of a vertical line passing through the line M as seen in FIGS. 3 and 4, the center of gravity will be displaced to the left of the axis M and the frame 12 will tend to pivot in a counterclockwise direction about the axis M. As long as the center of gravity G lies to the right of the left hand extremity of the drive belt 25, identified by the point A, the driving belt 25 will not tend to pivot about the point A and it will be maintained in full engagement with the terrain over which the snowmobile 11 is travelling. Alternatively, if the snowmobile 11 is in a static state, the shifting of the center of gravity will not cause the snowmobile 11 to overturn because the load on the driving belt is still within its width.

The situation at the front of the snowmobile will now be described with reference to FIG. 4. In the illustrated embodiment, the unladened weight of the snowmobile 11 is such that it is borne 50% by the front ski 19 and 50% by the driving belt 25. Of course, this relationship may be changed if desired. When the frame 12 tends to tilt toward the left as shown in this figure, and as long as the center of gravity G is disposed to the right of the extreme left hand end of the ski 19, represented by the point B, the snowmobile will tend to right itself. However, if the center of gravity G is permitted to shift to the left of the point B, there will be a tendency for the snowmobile 11 to fall down, particularly when unattended.

In an embodiment of the invention, the stops 66 are disposed relative to the shaft 56 so that the center of gravity G can not shift to the left of the point B or to the right of the extreme opposite end of the front ski 19. However, even if the situation is such that the stops permit the center of gravity G to move beyond the extreme portion of the front ski 19, the effect on the driving belt 25 will still tend to maintain the snowmobile 11 in an upright condition so long as the center or gravity G does not shift too great a distance outwardly toward the periphery of the driving belt 25.

In order to support the snowmobile 11 when it is not in use, a support lever 67 is pivoted on one side of the snow guard 32 by means of a pivot pin 68. The support lever 67 has a foot portion 69 that is adapted to engage the terrain and to assist in preventing the snowmobile 11 from tipping over. Since the stops 66 maintain the maximum tilting movement so that the center of gravity G always lies within the periphery of the drive belt 25, the support lever 67 need not bear any significant weight and thus can operate effectively in snow. The stability will be further improved if the stops 66 limit the tilting movement so that the center of gravity G can not pass beyond the periphery of the front ski 19.

It should be readily apparent that the construction described limits the leaning movement and, accordingly, permits a construction wherein the snowmobile may be left unattended and will not fall over. The support 67 can be pivoted to the oprative position shown in FIG. 3 to further assist in this support. It is to be understood by those skilled in the art that various changes and modifications can be made in that the foregoing description is only that of a preferred embodiment and that the scope of the invention is as defined by the appended claims.

I claim:

1. In a small, lightweight vehicle having frame means, a single front ski supported for steering movement by said frame means, a rider's seat carried by said frame means, a relatively narrow endless driving belt of a width narrower than said rider's seat and beneath said rider's seat, power means for driving said driving belt, said driving belt having a drive portion thereof positioned for engaging the terrain over which said vehicle is operated for driving said vehicle therealong, the improvement comprising suspension means for supporting said drive belt and said frame means for relative pivotal movement about an axis that extends generally longitudinally relative to said frame means so that an operator may lean said frame means relative to said driving belt without changing the area of engagement between said driving belt and the terrain, and means for limiting the pivotal movement of said frame means relative to said driving belt along said longitudinal axis so that the center of gravity of said vehicle does not move beyond the peripheral edges of said front ski when said front ski maintained in a straight ahead position and the frame means pivots relative to the drive belt about the longitudinal axis.

2. In a small, lightweight vehicle as claimed in claim 1 wherein the suspension means further permits movement of the frame means relative to the driving belt in a vertical direction.

3. In a small, lightweight vehicle as claimed in claim 1 wherein the limiting means is effective to prevent the unladened center of gravity of the vehicle to move outwardly beyond the peripheral edges of the driving belt.

4. In a small, lightweight vehicle as claimed in claim 3 further including support means carried by the frame means and adapted to engage the terrain for supporting the frame means independently of an operator.

* * * * *